No. 778,905. Patented January 3, 1905.

UNITED STATES PATENT OFFICE.

VALENTINE SELLIER, OF NORTH PELHAM, NEW YORK.

THEATER-SCENERY AND PREPARATIONS THEREFOR.

SPECIFICATION forming part of Letters Patent No. 778,905, dated January 3, 1905.

Application filed February 5, 1904. Serial No. 192,222.

*To all whom it may concern:*

Be it known that I, VALENTINE SELLIER, of North Pelham, New York, have invented new and useful Improvements in Theater-Scenery and Preparations Therefor, which are fully set forth in the following specification.

My invention relates to scenery in theaters.

Heretofore there have been employed canvases or curtains somewhat translucent and having a scene painted on the front with the main features silhouetted in black on the rear of the canvas. When the lights are lighted in front of the canvas, the painted scenery appears, and when the lights in front are turned down and the lights turned up behind the scenes the silhouette stands out in black, and an effect of moonlight or sunrise, &c., is produced. These effects, however, are quite crude and besides are limited to the silhouette appearance referred to and a few of the lighter colors.

The object of my invention is to produce a uniformly translucent screen or canvas and to permit the use of an unlimited number of shades of colors and also to permit the blending of the color effects produced by the painting on the front of the screen with those on the rear. A further object is to render the scenery fireproof.

The invention consists in the arrangement of the screen and in the chemical preparations applied thereto and also in the various details hereinafter pointed out. It will be best understood by the following detailed description, in which I explain the use of a double canvas; but a single canvas may be employed.

I first take two sheets of canvas, linen, cotton, or other fabric (which I shall hereinafter refer to as "canvas" for convenience) and wash them thoroughly to make them perfectly clean and white. The two canvases while wet are stretched tightly upon a frame or stretcher one above the other to make a double thickness and are allowed to dry. I next take gelatin and cleanse it thoroughly from impurities and apply it to this double canvas and permit it to dry. I thus obtain a double canvas having its interstices filled with gelatin, so that it constitutes practically one sheet, and this constitutes my new canvas. I then coat both front and back with a mixture of silver-white and my new varnish, whose preparation I shall later describe. In cleaning the gelatin before its application to the canvas I may proceed as follows: I first wash it thoroughly with water, and then remove this water and flood or cover the gelatin with a mixture of about ninety per cent. water and ten per cent. of chlorid of ammonia and sulfate of ammonia, (preferably in substantially equal parts,) which treatment will render my new canvas fireproof.

To prepare my new varnish, I place copal in a vessel and cover it with alcohol and inclose it to prevent the alcohol from evaporating and permit it to stand for two or three days. Then I place the vessel in boiling water and permit the mixture to boil in the double boiler for two or three hours, at the end of which time it will be apparently dissolved. The mixture is then allowed to cool, when a gummy or syrupy precipitate will be deposited. I carefully pour off the clear solution and then add mastic to the syrupy residuum to the point of saturation. The object of the mastic is to give pliability to the varnish after it has been applied to the canvas, so as to prevent cracking. To this mixture containing copal and mastic I then add thymic acid (or thymol, $CHOH$) drop by drop until the varnish is clear. This thymic acid serves a twofold purpose: it not only clears the varnish, (making it transparent,) but also serves in dissolving the silver-white before referred to. Having thus obtained the varnish containing copal, mastic, and thymic acid, I dissolve the silver-white in it, using more or less of the paint, according to the quality and the effect desired. I then paint the back and the front of my gelatined double canvas with this mixture. I can then apply the various paints to produce the desired scenery effects both on the front and back of this prepared canvas.

Various changes may be made in the procedure and considerable latitude permitted in the proportions and in the method of procedure and in the duration of the steps. For instance, the thymic acid need not be applied until the silver-white is being mixed with the copal-mastic preparation; but I prefer applying the thymic acid first, because it is desirable to use as little thymic acid as possible in the mixture, since an excess would be injurious to the other ingredients. When the copal-mastic mixture becomes clear, that is a sign that sufficient thymic acid has been employed, not only for the purpose of making the varnish translucent, but also for subsequently dissolving the silver-white. Also parts of my invention may be used to the exclusion of other parts without departing from the spirit of my invention.

A canvas prepared as described with my new varnish and the white paint is uniformly translucent and when properly painted by the artist permits the greatest variety in the use of colors and in the blending of colors in front and in the rear. It is not limited to the use of a black silhouette at the rear as heretofore. The new canvas thus prepared is durable and can be rolled up without cracking and above all is fireproof.

Having thus described the various features of my invention, I claim—

1. A fabric for theater-scenery consisting of two sheets of canvas held together and having their interstices filled with gelatin.

2. A fabric for theater-scenery consisting of two sheets of canvas held together and having their interstices filled with gelatin treated with ammonia sulfate and chlorid of ammonia.

3. A fabric for theater-scenery consisting of two sheets of canvas held together and having their interstices filled with gelatin rendered fireproof.

4. A fabric for theater-scenery coated with a mixture of silver-white and varnish containing thymic acid.

5. A fabric for theater-scenery consisting of two sheets of canvas held together and having their interstices filled with gelatin, and coated with a solution of silver-white and varnish.

6. A canvas for theater-scenery impregnated with gelatin, and coated on both sides with a solution of silver-white and varnish containing thymic acid.

7. A canvas for theater-scenery coated on both sides with a solution of silver-white and varnish containing thymic acid.

8. A canvas for theater-scenery impregnated with gelatin rendered fireproof, and coated with a mixture of a white paint and a varnish containing copal and mastic with thymic acid.

9. The herein-described translucent and pliable fabric for theater-scenery, consisting of canvas impregnated with fireproofed gelatin, and coated on both of its outsides with a compound of silver-white and a copal-mastic varnish containing thymic acid.

In testimony whereof I have signed this specification in the presence of two subscribing witnesses.

VALENTINE SELLIER.

Witnesses:
 HUGH O'NEILL,
 DAVID FRANKE.